United States Patent [19]

Klein

[11] 4,178,342

[45] Dec. 11, 1979

[54] INJECTION MOLDING METHOD FOR THE MANUFACTURE OF A SNELLED FISHHOOK

[76] Inventor: Gerald B. Klein, 13451 Stuart Ct., Broomfield, Colo. 80020

[21] Appl. No.: 876,950

[22] Filed: Feb. 10, 1978

Related U.S. Application Data

[63] Continuation-in-part of Ser. No. 763,825, Jan. 31, 1977, abandoned, which is a continuation of Ser. No. 580,182, May 23, 1975, abandoned, which is a continuation-in-part of Ser. No. 473,721, May 28, 1974, abandoned, which is a continuation-in-part of Ser. No. 277,756, Aug. 3, 1972, Pat. No. 3,834,061, which is a continuation-in-part of Ser. No. 274,307, Jul. 24, 1972, abandoned, which is a continuation-in-part of Ser. No. 335,081, Feb. 23, 1973, Pat. No. 3,898,760, which is a continuation-in-part of Ser. No. 128,015, Mar. 25, 1971, Pat. No. 3,717,907.

[51] Int. Cl.$^2$ .................... B29C 17/02; B29C 6/04; B29D 3/00
[52] U.S. Cl. ........................... 264/275; 43/44.83; 43/44.98; 264/274; 264/291; 264/296
[58] Field of Search ................ 43/44.83, 44.98; 264/274, 275, 291, 294, 243, 242, 296

[56] References Cited

U.S. PATENT DOCUMENTS

| | | | |
|---|---|---|---|
| 2,377,928 | 6/1945 | Fielitz et al. ............... | 264/DIG. 73 |
| 2,515,175 | 7/1950 | Arbogast ...................... | 264/291 |
| 2,747,320 | 5/1956 | Boland ......................... | 43/44.98 |
| 3,210,883 | 10/1965 | Ulsh ............................. | 43/44.83 |
| 3,287,483 | 11/1966 | Morin ........................... | 264/275 |
| 3,380,122 | 4/1968 | Kirk .............................. | 264/291 |
| 3,493,641 | 2/1970 | Svendsen ..................... | 264/98 |
| 3,508,553 | 4/1970 | Kanbar et al. ............... | 264/291 |
| 3,577,987 | 5/1971 | Bronnenkant ................ | 264/291 |
| 3,781,402 | 12/1973 | Hanggi et al. ............... | 264/243 |
| 3,826,034 | 7/1974 | Herek .......................... | 43/44.83 |

FOREIGN PATENT DOCUMENTS 671468 5/1952 United Kingdom ............ 43/44.83

*Primary Examiner*—James B. Lowe
*Attorney, Agent, or Firm*—Dennis O. Kraft

[57] ABSTRACT

An injection molding method is disclosed for the manufacture of a snelled fishhook. A thermoplastic, drawable, synthetic resin material is heated to a moldable state and flowed into an injection mold to form an intermediate product including a first slightly enlarged cylindrical portion at one end which envelops a shank of a hook, a snell strand coupled to the enlarged cylindrical portion, and a loop at the opposite end of the snell strand adapted to receive a fishing line. The snell strand and the loop strand of the intermediate product have oversized diameters. The snell strand is drawn between the first slightly enlarged cylindrical portion and the loop to reduce the snell strand to proper diameter and also to increase the strength of the strand. The loop is drawn between its crotch and its apex so as to reduce its diameter and increase its strength and toughness. A split multiple-section injection mold is further disclosed for carrying out both the molding and drawing procedures.

2 Claims, 6 Drawing Figures

INJECTION MOLDING METHOD FOR THE MANUFACTURE OF A SNELLED FISHHOOK

BACKGROUND OF THE INVENTION

This application is a continuation-in-part of application Ser. No. 763,825 filed Jan. 31, 1977 now abandoned which, in turn, was a continuation of application Ser. No. 580,182 filed May 23, 1975, now abandoned, which is a continuation-in-part of Ser. No. 473,721, 5/28/74, now abandoned; continuation-in-part of Ser. No. 277,756, 8/3/72 now U.S. Pat. No. 3,834,061; continuation-in-part of Ser. No. 274,307, 7/24/72, now abandoned; continuation-in-part of Ser. No. 335,081, 2/23/73, now U.S. Pat. No. 3,898,760; which is a continuation-in-part of Ser. No. 128,015, 3/25/71 now U.S. Pat. No. 3,717,907.

This invention generally relates to an injection molding method for the manufacture of a snelled fishhook, which fishhook is to be connected to a fishing line via the snell. The invention relates more specifically to the manufacture of a snell formed of nylon or similar plastic material having a hook integrally connected at one end thereof and a line connector at the other end thereof, and wherein the snell and the end connectors are formed as a simple, unitary structure.

Conventionally, a fishhook is formed with an eye at its shank end. One end of a snell, a strand of silk or nylon, is connected to this fishhook by threading the snell through the eye of the hook and tying it upon the shank of the hook adjacent to the eye. The other end of the snell is attached to a leader or a line and ordinarily, a loop is tied at the end of the snell so that the snell may be easily attached to a leader or a line. The knots used for tying a snell to a hook and for tying a line-connecting loop must be special, double-looped knots since nylon or silk strands commonly used for this purpose are very slippery when wetted. If common knots are used, they will slip loose from the hook or the line, usually at the time when a good fish is caught.

This tying of knots in a snell to attach the hook and to form a loop at the opposite end of the snell requires both skill and time and is a major expense in the manufacture of fishhooks having snells attached to the hooks. It can also be a problem where a fisherman ties his own snells onto his hooks, for he must carefully tie proper knots onto the hook to prevent the snell from slipping when it is wet. This requires a high degree of skill and patience and can become especially difficult when a fisherman is not in a well lit area, but is along a bank or in a boat when weather conditions are not the best. Thus, many fisherman prefer fishhooks with snells attached to them.

To address these problems and satisfy the real and definite need for an improved and simplified mode of connecting a snell onto a hook, a snell of nylon or similar material having a hook connector at one end thereof and a leader connector at the opposite end thereof was developed as a unitary structure. Details of such unitary structures can be found in the disclosure of my prior U.S. Pat. No. 3,983,657. Such an integral snelled fishhook provided a device which simplified the problems of attaching a hook to one end of the snell and attaching a line, or leader, to the other end of the snell and further provided a device which was well-adapted to economical assembly or production line techniques.

One particularly promising and popular embodiment of such unitary snelled fishhook is the embodiment disclosed in said prior patent and further in FIG. 1 of the instant application drawings which constitutes a hook connector at one end which is molded about an integral with the shank of a fishhook, an elongated drawn interconnecting strand coupled to the hook connector, and an eye loop strand coupled to the elongated drawn strand and to which is ultimately tied a fishing line.

SUMMARY OF THE INVENTION

It is the primary objective of the instant invention to provide an improved injection molding technique as well as an apparatus therefore specifically designed for the economical manufacture of such snelled fishhook.

This objective, as well as others which will become apparent as the description proceeds, are implemented by the injection molding technique of the instant invention which contemplates the injection molding of an intermediate product having a snell strand of somewhat oversized diameter as contrasted with the desirable finished product, a first slightly enlarged cylindrical portion at one end of the snell strand which is preferably molded about the shank of a fishhook, and a loop at the opposite end of the snell strand to receive a line, the loop of the intermediate product similarly being of slightly enlarged or oversized diameter.

Once the intermediate product is injection molded, the snell strand is drawn between the first slightly enlarged cylindrical portion and the loop to reduce the snell strand to proper diameter and also to increase the strength of the strand. The loop itself is drawn between its crotch and its apex so as to reduce its diameter and increase its strength and toughness.

In one preferred embodiment of the instant invention, the drawing of the snell strand takes place while firmly gripping the hook which is molded into the end connector. In this fashion, any defective coupling of the hook to the end or hook connector will be evidenced by a failure during the drawing operation.

The instant invention further contemplates the provision of a unique molding apparatus constituting multiple sections and which is capable of effecting not only the molding steps of the process described herein, but also the drawing operations so as to mass produce the final snelled fishhook product.

BRIEF DESCRIPTION OF THE DRAWINGS

The invention itself will become better understood and further features and advantages thereof will become apparent from the following detailed description of the preferred inventive embodiments, such description making reference to the appended sheets of drawings wherein.

DETAILED DESCRIPTION OF A PREFERRED INVENTIVE EMBODIMENT

Figure 1:
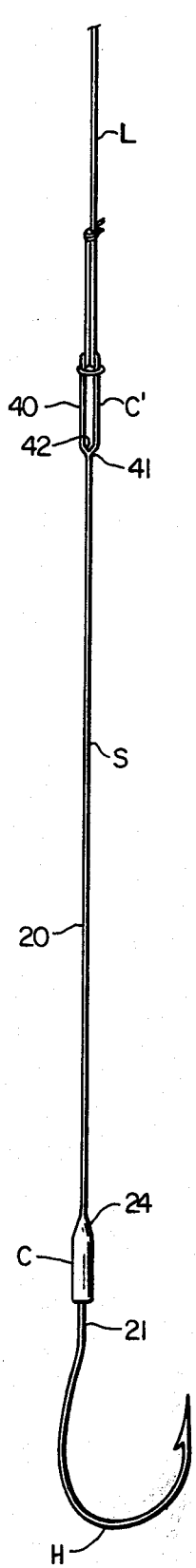
FIG. 1 is an illustration of a snelled fishhook having an eye loop at one end thereof for attachment to a fishing line, such snelled fishhook constituting the product produced by the process of the instant invention.

Referring more particularly to FIG. 1 of the drawings, a snelled fishhook as manufactured by the techniques of the invention comprises a small diameter snell strand S, having a hook connector C at its base end and a line connector C' in the form of a loop at its top end, all as a one-piece, unitary structure. It is to be understood that the references to the base end and top end of the snell are arbitrary and are used only to facilitate the description of the snell herein. Also, it is to be understood that the "line" herein referred to may be, and usually will be, a nylon leader, as well as any other conventional type of a fishing line. The snell and connectors are made with nylon or like material essentially the same as used in the manufacture of conventional snells; however, it is manufactured by an injection molding process instead of an extrusion process. Thus, while the cost per unit might be increased, the greater costs for tying knots is eliminated and thus, the manufacture of the device by an injection molding process, as hereinafter described, will actually be a low cost operation. A hook is attached to the hook connector C during the molding operation. A line will be attached to the line connector C' by threading an end of the line into a passageway through the loop strand at the top of the connector as shown and tying same. This will ordinarily be a field operation performed by a fisherman whenever he uses the snelled hook.

The hook connector C at the base of the snell is a small elongated body which may be somewhat cigar shaped or nearly cylindrical as shown. The connector C is preferably symmetrical about its longitudinal axis and it is formed with an axially centered socket which is molded about the envelopes the shank 21 of a fishhook. The shank may be smooth or alternatively may be barbed or ribbed to effect maximum adhesion. The bottom end of the connector may be flat or slightly rounded as illustrated, or even tapered.

The opposite top end of the hook connector C merges with the small diameter snell strand 20 and it is desirable that this change from the larger diameter of the connector to the smaller diameter of the strand 20 be effected through a smooth transition section 24 having its corner portions well rounded to prevent any disruption of the surface of the connector C or strand S at the edges of this transition section. The snell strand 20, if formed of nylon or like material, must be drawn to align the molecular structure within the strand to an arrangement which provides for a maximum tensile strength. This is important since the strand 20 may have to be of a very small diameter to prevent it from being obvious and apparent to a fish. Thus, while the strand must be drawn, the connector at the end of the strand will not be drawn in the manufacturing process. Thus, it becomes desirable for the end of the transition section 24 adjacent to the strand to gradually increase in diameter either by a taper or by a curving, flaring section as illustrated to permit the effect of drawing the strand 20 to merge into the transition section without a sudden disruption of the internal structure between the strand and the connector. When a drawing occurs, the reduction of the strand diameter will form a moving shoulder, as hereinafter described, and this shoulder portion will ultimately move from the strand 20 and to the transition section, but the drawing will cease as the cross sectional area of the transition section increases to the point where it has the same tensile strength as that of the drawn strand 20. The terminal point of the draw may produce a uniform surface at the transition or it may be more abrupt to produce a slight ring-like disruption a short distance from the point where the transition section merges with the strand 20.

The line connector C' is formed as a simple loop 40, the strands of which may or may not be slightly smaller in diameter than the snell strand 20. This loop 40 is molded into the snell, and this loop 40 is somewhat elongated in the direction of the axis of the snell shank 20 as illustrated. The juncture between the snell shank 20 and the loop 40 is a Y-branch 41 having a transverse diameter somewhat larger than the diameter of the snell shank 20 and larger than the loop strand 40. This Y-branch is formed with smooth transitions, with a rounded crotch 42 when the opposite ends of the loop strand 40 join. It is to be noted that not only must the snell strand 20 be drawn, but that the loop strand 40 must also be drawn to provide requisite strength and hardness to these strands to withstand the stress to which the loop will be subjected during use.

Figure 2:
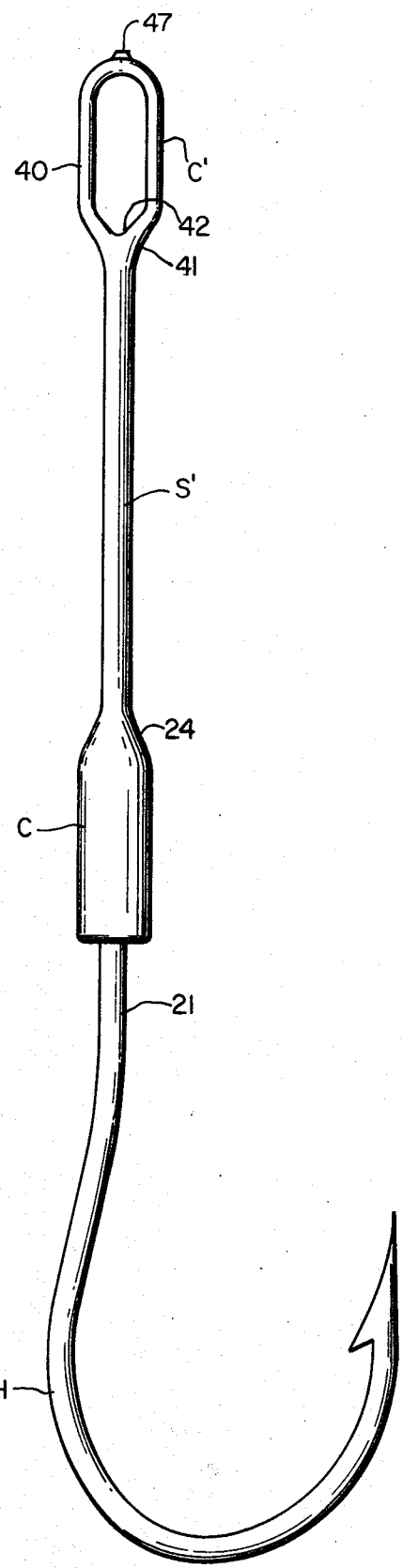
FIG. 2 is a perspective illustration of an intermediate product produced as the first step in the injection molding technique of the instant invention.

In the manufacture of the snelled fishhook of FIG. 1, a molded intermediate article as shown in FIG. 2 is initially produced, preferably through the use of a novel split injection mold device of the type shown in FIGS. 4–6 of the drawings and as will be described in more detail hereinbelow. The finished end connector C with a fishhook H therein which is formed during the injection molding step need not be modified further. On the other hand, the snell strand S' is significantly larger in diameter and shorter than the snell strand S which will exist in the finished unit after the unit is drawn as shown in FIG. 1. The loop connector C' is also shorter and larger in diameter when it is molded and this loop must also be drawn to take the form shown in FIG. 1.

The further step in the manufacture of the unit will be in drawing the snell strand S' of FIG. 2 to a length which may be as much as several hundred percent of its original length. Such a drawing will be accompanied by a reduction in diameter of the strand but the smaller drawn strand will have a strength which even exceeds the strength of the original, larger diameter undrawn strand which is formed during the injection molding. It is necessary to draw the strand at a proper temperature and at a proper rate and the drawing may occur as a subsequent operation. However, this can be easily worked out by a skilled aritsan and need not be described further.

Figure 3:
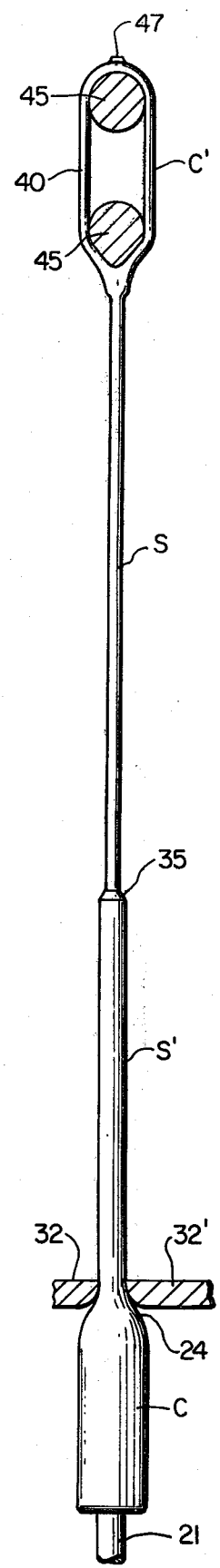
FIG. 3 is a schematic illustration of the drawing operation worked upon the intermediate product of FIG. 2 so as to effect a drawing and elongation of the snell strand and of the eye loop.

An exemplary, though schematic, illustration of the drawing operation of the snell strand is depicted in FIG. 3 of the application drawings. In this exemplary drawing operation, the hook connector C may be gripped by a pair of grippers 32 and 32', while at least one post or stand rod means 45 which is in the embrace of the eye loop strand 40 is provided at the opposite end of the snell. Initially, and by means of illustration, the post or stand rod means 45 and the grippers 32 and 32' would move away from one another so as to draw the strand S'. This drawing action is not accomplished in a uniform manner over the entire reach of the nylon strand but is accomplished in a continuing manner, wherein a reducing of the strand diameter occurs at a shoulder 35 which moves from one position to another with the undrawn nylon strand S' at one side of the shoulder 35 and the drawn strand S at the other side of the shoulder 35. This shoulder moves in either direction toward the respective connector C or C' and, when the transition section 24 of connector C or the crotch of the eye loop connector C' is reached, the drawing at that end of the snell will cease, while the drawing at the other end will continue until the transition section of the other connector at the opposite end is reached.

Instead of providing the grippers 32 and 32', it is possible and in fact preferred that the end of the hook H be held during the draw of the strand S. The hook may be gripped in any suitable manner or may be held by a simple post, for example. The advantage of holding the hook during the draw is best realized in mass production operations because any defective connection of a snell and hook will cause the snell to pull away from the hook and thus, the operation will serve to automatically and intrinsically reject such defective units.

An additional drawing step is necessary with respect to the intermediate product of FIG. 2 to form the eye loop or loop strand 40 of connector C'. Specifically, the drawing of the loop strand 40 is itself necessary so as to effectively temper the nylon loop strand 40 to strengthen and harden the nylon after the same is molded, for a hard leader could cut an undrawn nylon loop. To effect such a drawing, a second post or stand rod means 46 would be provided which seats at the crotch 42 of the Y-branch 41 of the eye loop to move away from the first post 45 to assure that the loop connector C' is also perfectly drawn.

It should be recognized that with the exemplary drawing operations as above-described, it was presumed that the relative motion away from one another of the first stand rod means 45 and grippers 32 and 32' effected the drawing of the snell strand S'. For this to properly occur, the diameter of the loop strand 40 and the snell strand S' should be balanced to require the same pull. If not, the diameters of the strands are such that the combined strength of the two reaches of the loop strand 40 to the Y-branch 41 will exceed the strength of the snell strand 20. Thereafter, the moving away of the second post or stand rod means 46 which seats at the crotch 42 of the Y-branch 41 from the first post 45 will assure that the loop connector C' is perfectly drawn.

It is entirely possible, however, to effect the drawing of the snell strand S' without utilizing the stand rod means 45 in that a second pair of grippers, such as grippers 32 and 32', could simply be provided to the Y-branch 41 of the eye loop so as to hold that branch while the snell strand is being drawn. Because of the small size of the Y-branch, this could be impractical, however, and the preferred mode of drawing is to draw the loop strand 40 simultaneously with, or after, the snell strand S' is drawn. Thus, the stand rod means or post 45 is utilized to hold the loop strand 40 against the pull of the grippers 32 and 32' at the opposite end of the snell S.

In the manufacture of the intermediate product of FIG. 2, it is desirable to flow material in an injection mold to or from the snell strand S' from or to both sides of the loop strand 40 and thence, from or to the apex of the loop. This will thus place a small nut 47 at the apex of the loop which is the remains of a cut-off stem formed by a vent lead or intake lead of the mold cavity which forms the unit. Though preferable, this location of a vent or intake in the mold forming the unit is optional.

Figure 4:
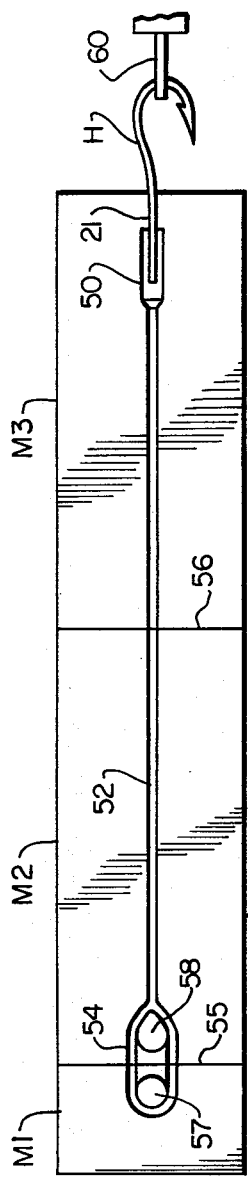
FIG. 4 is a top plan schematic illustration of one-half of a split and multi-section injection mold constructed in accordance with the teachings of the instant invention and adapted to carry out the manufacturing process taught herein.
Figure 5:
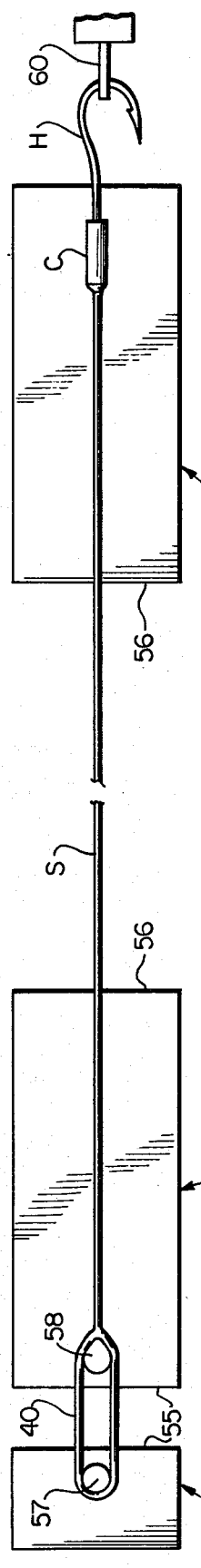
FIG. 5 is a top plan schematic illustration of the mold of FIG. 4 depicting the separation of the multi-sections thereof while effecting a drawing operation of the intermediate product of FIG. 2.
Figure 6:
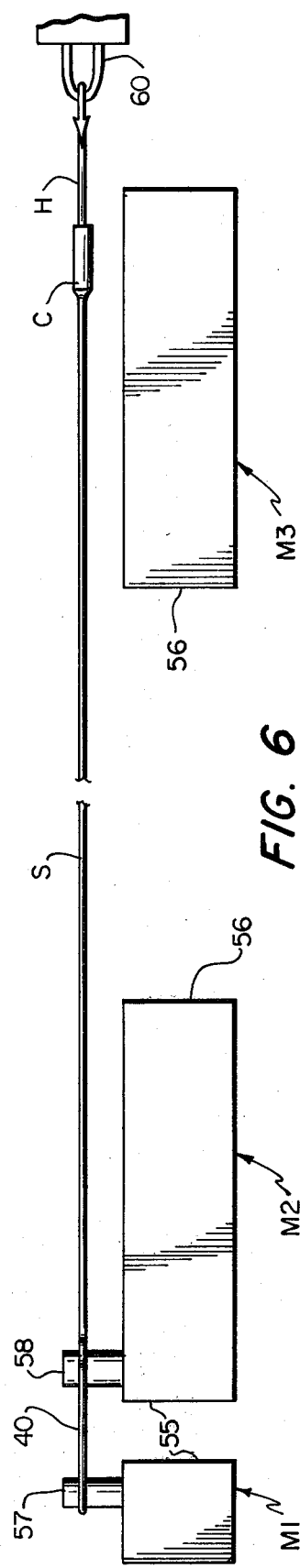
FIG. 6 is a side elevational though still schematic view of the separated mold configuration of FIG. 5.

In the preferred manufacturing process of the instant invention, the various molding and drawing steps referred to hereinabove are contemplated to be carried out in a unique split-injection mold which constitutes multiple movable sections and which is depicted in FIGS. 4 through 6 of the application drawings.

The injection mold of the instant invention will be seen to constitute elongated and separable superimposed mold halves of which the bottom half M is depicted in the drawings, the top half of the mold not being illustrated but constituting a mirror-image of the bottom half such that the mating surfaces of the mold halves incorporate registering cavities defining along the longitudinal axis thereof a first cylindrically enlarged area 50 adapted to receive the shank 21 of a fishhook H, an elongated narrow interconnecting passageway 52, and an eye loop passageway 54, all communicating and interconnected with one another.

At least one of the mold halves, such as mold half M as is illustrated, is formed of plural separable mold sections M1 as depicted in FIG. 5, as well as M2 and, optionally, M3. These plural sections are movable along the longitudinal axis of the mold and at least effect a parting 55 through the eye loop passageway 54. A second and optional parting may be effected such as at 56 along the elongated narrow interconnecting passageway 52.

Stand rod means such as is illustrated in FIG. 6 by reference numerals 57 and 58 are provided in the end section M1 of the mold, as well as in section M2, both stand rod means 57 and 58 being capable of rising from the surface of their respective mold sections within the embrace of the eye loop passageway 54.

In operation, the top and bottom mold halves would initially be superimposed one upon the other so as to form, in conventional fashion, an injection mold providing the various cavities of the form depicted in FIG. 4 of the application drawings. The shank 21 of a hook H would be inserted within the enlarged cylindrical cavity 50 within the mold by means of any suitable though non-illustrated mechanism, with such mechanism further effecting the function of securely clamping the hook H with a gripping mechanism such as is depicted by reference numeral 60.

A thermoplastic, drawable, synthetic resin material such as nylon, for example, would be heated and, in conventional fashion, caused to be injected within the mold cavities, effecting a flowing into the enlarged cylindrical cavity 50, the elongated interconnecting cavity 52, as well as into the eye loop passageway 54 in the generalized manner previously discussed. After cooling of the plastic, the non-illustrated top half thereof would be separated from the bottom half M. At this point, an intermediate article, such as the article depicted in FIG. 2 of the application drawings would have been formed, and the multisection bottom mold half M would itself effect the necessary drawing operations in the following manner.

Specifically, the stand rod means 57 and 58 would rise from the surface of the mold half to move within the embrace of the loop strand 40 so formed. By means of any suitable though non-illustrated mechanism, all three mold sections M1, M2 and M3 would move longitudinally apart. The sections M1 and M2, holding their respective stand rod means 57 and 58 would move apart a sufficient distance to permit the stand rod means to stretch and draw the eye. The other mold sections M2 and M3, and the hook clamp 60, for example, would also move apart to stretch and draw the snell filament S.

Subsequent to the stretching and drawing operations as above-described, the now-finished snelled hook would be ejected from the mold and the various mold sections would move together again, in cooperation with the other half of the mold so as to form another snelled fishhook. The hook feed mechanism with the clamp means 60 would receive another hook H, and the operation would be repeated.

It should be understood that, as discussed above, it is not necessary that the mold section M3 actually separate from the section M2, providing that the hook clamp means 60 can move away from the mold to stretch the same by the holding of the hook H. It further should be appreciated that the longitudinal separation of the mold sections is adjustable so that different polymers of nylon or co-polymers may be stretched to different lengths. As should be appreciated, the amount of stretch and molecular orientation to achieve optimum tensile strength would vary with the polymer used.

Other variations of the novel molding technique are possible. For example, the top and bottom mold halves might not initially separate prior to the stretching and drawing operation, but only after such drawing operation to effect removal and ejection of the formed product. As a further alternative, both the top and bottom mold halves could have multiple separable sections as was described with respect to the bottom half M hereinabove.

In a mass production operation, a plurality of molds of the type described and illustrated in FIGS. 4 through 6 in the application drawings would be provided, such molds being disposed in a ring, for example, such as along the various spokes of a wheel or revolving turret. A hook feed mechanism could be provided along the outer periphery of the revolving turret so as to feed hooks into each mold as it passed by. A standard injection molding nozzle could be placed at the center of the revolving turret so as to impart the flowable, thermoplastic resin to each mold containing the hook shank. Ejection of the finished product would take place at a latter station. In this mass-production configuration, it should be recognized that the positions of the injection mold nozzle and the hook feed mechanisms might be reversed, for example, multiple hook feed and injection molding nozzle stations could be provided, and, instead of a revolving turret, a revolving ferris wheel construction could be substituted.

In any event, and from the above descriptions, it should now be apparent that the primary objective of the instant invention has been achieved, a unique manufacturing process having been taught for the production of a unitary snelled fishhook.

What is claimed is:

1. An injection molding method for the manufacture of a snelled fishhook from a thermoplastic, drawable, synthetic resin material, the snell being of the type including a snell strand, a first slightly enlarged cylindrical portion at one end of the snell strand with an axial socket therein in which is received the shank of a hook, and a loop having a crotch and an apex at the opposite end of the snell strand to receive a line, said method comprising the steps of: heating the resin to a moldable state; injecting the resin into a mold such that the resin flows about the shank of a hook thereby forming the first slightly enlarged cylindrical portion and such that the resin further forms the snell strand and the loop strand with oversized diameters; holding the snell by the hook while drawing the molded snell strand between the hook and the second enlarged portion to reduce the strand to proper size and also to increase the strength of the strand, any defective connection of a snell and hook causing the snell to pull away from the hook to thus indicate a defective unit; and drawing the loop between its crotch and its apex so as to reduce its diameter and increase its strength and toughness.

2. A method for the manufacture of a snelled fishhook from the injection molding of a thermoplastic, drawable, synthetic resin material, utilizing an injection mold of the type including elongated and separable superimposed mold halves having mating surfaces which incorporate registering and communicating cavities defining along its length a first slightly enlarged cylindrical end portion, an elongated narrow interconnecting passageway in the form of a strand, and an eyeloop passageway, with at least one of the mold halves being formed of at least two separable mold sections which effect a transverse split across said eyeloop passageway to define an end mold section and a remaining mold section, each said section being provided with stand rods which are raisable up from the surface of each mold section, said stand rods being disposed to either side of the transverse split within the embrace of the eyeloop passageway, said method comprising the steps of: inserting the shank of a fishhook into the enlarged cylindrical cavity of the superimposed mold halves; heating the resin to a moldable state; flowing the resin into the cavities of the mold halves about the shank of the fishhook, through the narrow interconnecting passageway to form an enlongated strand, and in the eyeloop passageway to form a loop strand; separating the mold halves after the mold has cooled so as to leave the snelled fishhook so formed in the half of the mold which is formed of the at least two sections; raising the stand rods in the mold sections from the surface of each section to be upstanding within the embrace of the loop strand; separating the end mold section and the remaining mold section of the mold half at the transverse split thereof and moving the sections longitudinally apart from each other such that the stand rods engage the loop at its apex and its crotch, respectively, and effect a drawing of the loop between its apex and crotch; effecting relative longitudinal movement between the fishhook and said mold section of said mold half so as to draw the snell strand between the enlarged cylindrical portion and the apex of the loop; and ejecting the snelled fishhook so formed from the mold half.

* * * * *